Sept. 27, 1955 R. J. ROMAN 2,718,948
BALL TYPE DIRECTIONAL AND OVER-RUNNING CLUTCH SYSTEM
Filed Oct. 29, 1951 2 Sheets-Sheet 1
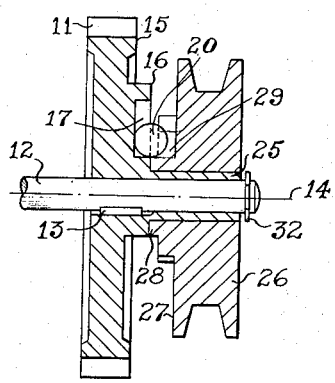
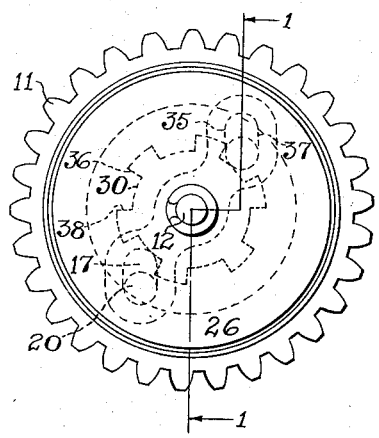
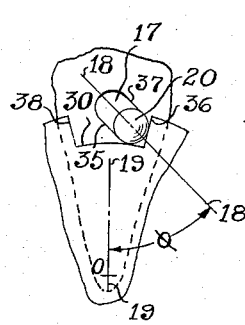
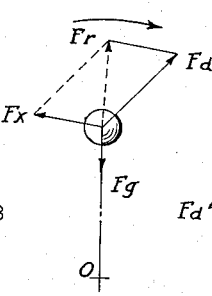
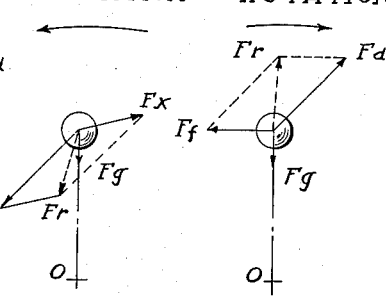
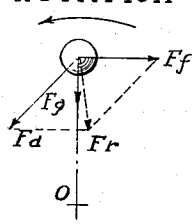
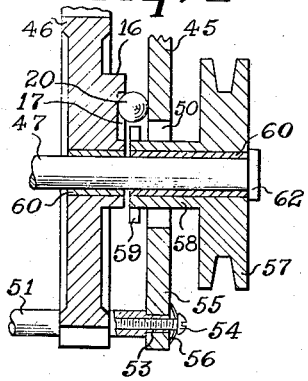
ROBERT J. ROMAN
INVENTOR.
BY
ATTORNEYS Sept. 27, 1955  R. J. ROMAN  2,718,948
BALL TYPE DIRECTIONAL AND OVER-RUNNING CLUTCH SYSTEM
Filed Oct. 29, 1951  2 Sheets-Sheet 2
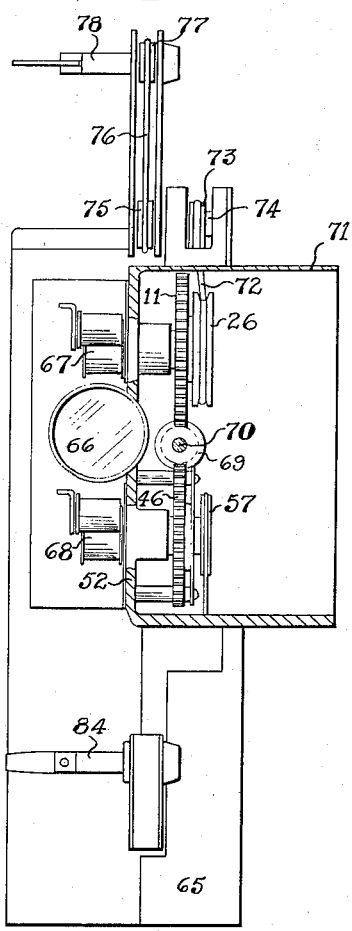
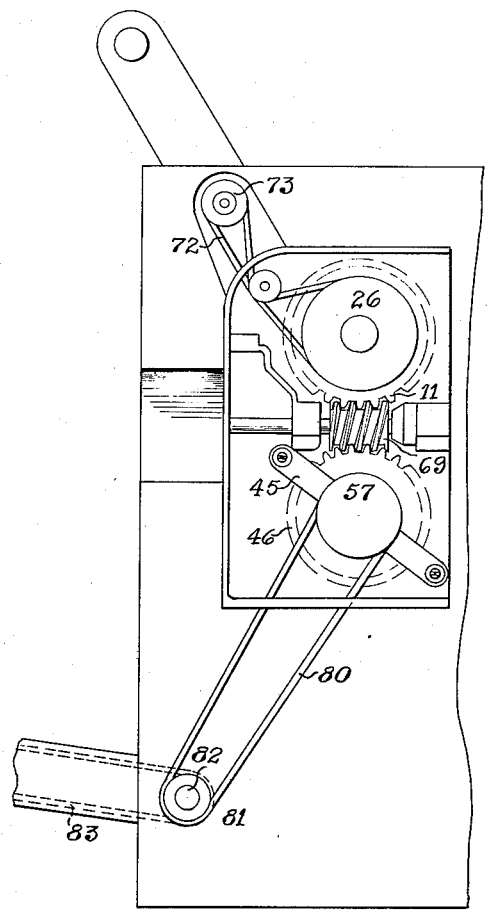
ROBERT J. ROMAN
INVENTOR.

United States Patent Office 2,718,948
Patented Sept. 27, 1955

2,718,948

BALL TYPE DIRECTIONAL AND OVER-RUNNING CLUTCH SYSTEM

Robert J. Roman, Rochester, N. Y., assignor to Eastman Kodak Company, Rochester, N. Y., a corporation of New Jersey Application October 29, 1951, Serial No. 253,662

8 Claims. (Cl. 192—45)

The present invention relates to clutches, and more particularly to clutches of the over-running and directional types.

An over-running clutch may be defined as one in which the engage and disengage conditions are determined by the relative rotation of the driver and driven members. A directional clutch, on the other hand, may be defined as one in which the engage and disengage conditions are determined solely by the motion of the driver.

The present invention has as its principal object the provision of a clutch design in which a movable ball serves to connect or disconnect the clutch parts under certain definite conditions.

Another object of the invention is the provision of a clutch in which the movement of the ball to engage or disengage the clutch parts is automatic and positive.

A further object of the invention is the provision of a clutch design which is simple, relatively inexpensive to manufacture, rugged, and positive in its operation.

To these and other ends, the inventive idea resides in certain improvements and combinations of parts, all as will be hereinafter more fully described, the novel features being pointed out in the claims at the end of the specification.

In the drawings:

Fig. 1 is a vertical sectional view through an over-running clutch constructed in accordance with the present invention, and taken substantially on line 1—1 of Fig. 2, showing the relation of the clutch parts;

Fig. 2 is a side elevation view of the over-running clutch of the present invention, as viewed from the right of Fig. 1;

Fig. 3 is a fragmentary side elevation of a clutch of the type shown in Figs. 1 and 2, showing the relation of the engaging clutch elements;

Fig. 4 is a simplified free body diagram showing the forces acting on the ball when the driver is rotated in the direction indicated by the arrow and relative to the driven members;

Fig. 5 is a view similar to Fig. 4, but showing the forces acting on the ball when the drive member is rotated in a counterclockwise direction to connect the clutch parts;

Fig. 6 is a vertical sectional view through a directional clutch constructed in accordance with the present invention;

Fig. 7 is a view similar to Fig. 4 showing the relation of the forces acting on the ball when the driver is driven in a clockwise direction, the parts being positioned to disengage the clutch members;

Fig. 8 is a view similar to Fig. 7, but with the driver of Fig. 6 rotated in the opposite or counterclockwise direction to engage the clutch parts;

Fig. 9 is a front elevation view of a motion picture projector, with the mechanism housing cut away to show the relation of the clutches of the present invention to the various parts of the projector; and Fig. 10 is a side view of the projector taken from the right of Fig. 9.

Similar reference numerals throughout the various views indicate the same parts.

The clutch structures will first be described in detail, after which one application of the clutches of the present invention will be described. The illustrated application of the clutches is not intended as a limitation, but merely one type of apparatus with which the clutches of the present invention may be used. It is apparent, however, that the clutches of the present invention have a wide variety of applications.

Referring first to the over-running clutch shown in Figs. 1-3, this clutch comprises a drive member 11 which is in the form of a gear mounted on and secured to a drive shaft 12 in any suitable and well known manner, such, for example, by a key 13. While the driver 11 in the present embodiment is a gear, it is apparent it may be any suitable member which may be rotated to impart rotation to shaft 12, which, in the present instance, is rotatable about the horizontal axis 14. The right face 15 of the member 11 has formed thereon one or more, in the present instance, two, axially extending bosses or flanges 16. Each flange 16 is formed with an axially open slot 17 the axis 18—18 of which is arranged at an angle, preferably 45°, to the vertical axis 19—19, see Fig. 3. Each slot 17 has loosely positioned therein, a ball 20 which is free to move along the slot, in a manner to be later described. The drive member or gear 11 is formed with an axially extending sleeve 25 surrounding the shaft 12 to support loosely thereon a driven member which, in the present embodiment, is in the form of a pulley 26. As the gear 11 rotates with the shaft 12, and as pulley 26 is mounted loosely on sleeve 25 which forms a part of gear 11, pulley 26 may be designated broadly as loosely mounted on shaft 12. The left face 27 of the pulley 26 is formed with an axially extending flange 28 which abuts flanges 16 to limit leftward movement of pulley 26 relative to shaft 12. Rightward movement of pulley 26 is limited by means of a collar 32 secured to shaft 12 in any suitable or well known manner. The periphery of flange 28 is formed with a plurality of ratchets, broadly designated by the numeral 29. Each ratchet comprises an open slot formed with an arcuate-shaped bottom 30 on which the ball 20 may rest, as shown in Fig. 3, and a pair of circumferentially spaced, radially extending shoulders 36 and 38 against which the ball 20 may abut, as shown in Fig. 3, and for a purpose to be later described.

It is apparent that if the drive member or gear 11 is caused to rotate about point O on axis 14, the angular relationship of axis 18—18 with respect to the driven member 26, also rotatable about point O, will be the same for any angle of rotation.

Figs. 4 and 5 are simplified, free body diagrams of the clutch parts illustrated in Figs. 1 and 2, showing the force on the ball 20 when the drive member 11 is rotated in the direction indicated by the arrows.

Referring now to Fig. 4, if the drive member 11 is rotated in a clockwise direction, the left side 35 of slot 17, see Fig. 3, will act on ball 20 with a force $F_d$ which is normal to the side 35. Also, the right radial shoulder 36 of the ratchet will provide a reacting force $F_x$ which will act on the ball 20 in a direction normal to the shoulder 36. $F_g$ represents the force of gravity due to the weight of the ball 20, but, as this force is small compared to $F_d$ and $F_x$, it may be disregarded in the present analysis.

Now, applying the principle of parallelogram of forces to the force, $F_d$ and $F_x$, it is seen that the resulting force $F_r$ is upward. The direction and amount of the resultant force $F_r$ is such as will move the ball 20 upward along slot 17 and out of engagement with the shoulder 36 to disengage the clutch members 11 and 26. Thus, when the drive member 11 is moved in a clockwise direction relative to the driven member 26, the clutch parts will be disengaged.

However, when the drive member 11 is rotated in a counterclockwise direction relative to the driven member 26, as indicated by the arrow, Fig. 5, the right side 37 of slot 17 will act on ball 20 with a force $F_d$ which is normal to side 37. Also, ball 20 will act on the left shoulder 38 with a force $F_x$, see Fig. 5, which is normal to side 38. Again disregarding force $F_g$, the parallelogram of force of $F_d$ and $F_x$, see Fig. 5, shows that the resulting force $F_r$ is in a downward direction so as to move the ball 20 downward along slot 17 and into driving engagement with shoulder 38 to connect the clutch members 11 and 26.

Thus, when the drive member 11 is rotated in a clockwise direction relative to the driven member 26, the resultant force $F_r$ (Fig. 4) will move the ball 20 in a direction to disconnect or disengage the clutch members 11 and 26. However, when the drive member 11 is rotated in a counterclockwise direction relative to the member 26, the resultant force $F_r$ (Fig. 5) is in a direction to move the ball 20 into engagement with shoulder 38 to connect members 11 and 26, so that the latter will be driven from the shaft 12. Thus, the engaging and disengaging conditions of the members 11 and 26 of the over-running clutch, illustrated in Figs. 1 and 2, are determined by the relative rotation of the clutch members, as is deemed apparent from the above description, and the analysis of the force diagrams, Figs. 4 and 5.

Fig. 2 shows a two-ball arrangement of an over-running clutch assembly in which the balls are mounted 180° apart. Each ball is free to move along its slot 17. In order to prevent escape of the balls from their slots 17, the inner edge of flange 16 is spaced from the adjacent left face 27 of pulley 26 a distance less than the diameter of the balls 20, see Fig. 1, so that the balls are retained positively and securely in the slots 17. Thus, while the balls 20 are free to move along the slots, they cannot escape from the assembly. With this two-ball arrangement, as each ball approaches the top of its travel it will fall into engagement with one of the ratchets 29, and when it approaches the bottom of its travel it will drop out of engagement. This is how the clutch satisfies the engagement requirements of Figs. 4 and 5. In the present embodiment two balls are used so that one will always be falling into engagement. While the two-ball arrangement is illustrated and described, this is by way of illustration only, as it is deemed obvious that a larger number of balls could be employed without departing from the structure or spirit of the present invention.

Figs. 6–8 relate to a directional type of clutch which differs from the over-running clutch (Figs. 1–3), in that the ball 20 is not held in place between the drive and driven members, as in Figs. 1 and 2; but, on the contrary, is restrained yieldably between the drive member and a fixed non-rotatable wall or plate 45, as shown in Fig. 6, and to be more fully described. The parts in Figs. 6–8 corresponding to those of Figs. 1 to 3, are designated by the same numerals.

In the embodiment shown in Fig. 6, the drive member is in the form of a gear 46, which is fixed or secured to the shaft 47, in any suitable or well known manner, so as to rotate as a unit therewith. A stationary non-rotatable plate or wall 45 is positioned adjacent the drive member 46 and is formed with a central aperture 50 through which the drive shaft 47 extends, as clearly illustrated in Fig. 6. The gear 46 also is formed with an axially extending boss 16 formed with inclined slots 17 to receive the balls 20. This arrangement is exactly the same as that shown and described in connection with Figs. 1 to 3. Each ball 20 is retained in its slots 17 by yieldably pressing the ball against wall or plate 45. To secure this result the plate 45 is mounted for sliding axially but non-rotatable adjustment. To this end, a pair of axially extending posts 51 is secured to a base plate 52 of the projector, see Fig. 9, and extend through registering openings 53 in plate 45. The free ends of the posts 51 are provided with enlarged head portions 54 between which and the adjacent face 55 of plate 45 are positioned bow springs 56. These bow springs 56 serve to press the plate 45 yieldably in an axial direction towards the axially fixed gear 46 to hold or press the balls 20 yieldably between the gear 46 and the plate 45 to retain the balls in slots 17 to prevent escape therefrom, as is deemed apparent from an inspection of Fig. 9.

This is the arrangement for holding the balls 20 yieldably in slots 17 and is the preferred structure. However, other suitable arrangements will readily suggest themselves to any mechanic. For example, the wall or plate 45 may be made rigid or fixed. In this case the gear 46 could be splined to the shaft 48 for slight axial movement relative thereto, but rotatable as a unit therewith. Then, a collar could be fixed to the shaft 47 just to the left of gear 46, Fig. 6, and a bow spring could be inserted between the collar and the gear. This bow spring would tend to shift the gear and ball slightly to the right to hold the ball in yieldable engagement with wall 45. In any case, however, the balls 20 are held in position between the gear or drive member 46 and the wall 45.

The driven member, which is in the form of a pulley 57, is placed on the opposite side of the plate 45 from the gear 46, as clearly illustrated in Fig. 6. The pulley 57 is formed with an axially extending sleeve 58 which projects through the aperture 50 of plate 45, and terminates just short of flange 16 of gear 46 and in vertical or radial alignment with the balls 20, as shown in Fig. 6. The circumference of the free end of sleeve 58 is formed to provide a plurality of ratchets 59 which are identical in structure to the ratchets 29 above described. Thus, the embodiment of Fig. 6 is provided with a ball and slot arrangement, and a cooperating ratchet structure both of which are identical to those of the clutch illustrated in Figs. 1 and 2, so that further description is not deemed essential. Suitable bearings 60 may be positioned between members 46 and 57 and the shaft 47. The driven member 57 is held in a substantially fixed, axial position between the axial flange 16 of the driven member 46 and an enlarged flange or collar 62 formed or positioned on the right end of shaft 47, as shown in Fig. 6.

While the actual elements used in clutching the parts of the mechanism shown in Fig. 6 are the same as those shown in Figs. 1 and 2, the exact operation is slightly different as will now be described. Figs. 7 and 8 are simplified free body diagrams of the clutch illustrated in Fig. 6, showing the various forces which are set up when the drive member 46 is rotated in different directions.

Referring now to Fig. 7, it is seen that if the drive gear 46 is rotated in a clockwise direction, the left edge of the slot 17 will act on ball 20 to provide a force $F_d$ which is identical to force $F_d$ of Fig. 4. As the gear 46 is rotated, there will be set up a frictional force $F_f$ between ball 20, plate 45 and the right face of gear 46 (force $F_f$=the coefficient of friction between the surfaces and the normal pressure resulting from the spring tension on plate 45). This force $F_f$ will be in the direction opposite to the direction of rotation of the driver 46, or as shown in Fig. 7. Disregarding the slight force $F_g$ due to the weight of the ball, the resultant force $F_r$ of $F_d$ and $F_f$ is of the amount and direction shown in Fig. 7. It is apparent from an inspection of Fig. 7 that the direction of $F_r$ is such as to cause the ball 20 to move radially outward and out of engaging relation with the ratchet 59 to disconnect gear 46 from pulley 57.

However, if the gear 46 is rotated in a counterclockwise direction, as shown in Fig. 8, the opposite edge of slot 17 will act on the ball 20 to provide the force $F_d$ which is in the direction shown in Fig. 8, and which is similar to $F_d$ of Fig. 5. Thus, when the direction of rotation is reversed, the direction of $F_d$ is reversed. It will be apparent from the above discussion relative to Fig. 7, that if the driver 46 is rotated in the opposite direction, as shown by the arrow Fig. 8, $F_r$ will be equal in amount to that of Fig. 7 but in the opposite direction, as shown in Fig. 8. Thus, $F_r$ Fig. 8 will be downward and in an amount so as to move ball 20 into engagement with the ratchet 59 to connect gear 46 to pulley 57, as is deemed apparent from the free body diagram of Fig. 8.

Thus, in the directional clutch illustrated in Fig. 6, the engaged and disengaged conditions are determined solely by the direction of rotation of the drive member or gear 46. However, in the over-running clutch of Figs. 1–3, the engaged and disengaged conditions are determined by the relative rotation of the drive and driven members. Thus, while the two clutches embody certain elements or features which are common, they operate on entirely different principles.

The above-described clutches may be used for a wide variety of purposes. One application in which both forms of clutches may be used advantageously is in a motion picture projector, illustrated in Figs. 9 and 10. As the parts of the projector, aside from the clutches, may be of any suitable or well known construction, and form no part of the present invention, only so much of the projector is shown and described as is necessary to a full understanding of the application of the clutches of the present invention.

Such a projector comprises, in general, a base or support 65 which has mounted thereon the projection lens 66. Film moving sprockets 67 and 68 are positioned on opposite sides of the lens 66 and serve to move or feed the film strip, not shown, through a film gate, not shown. The sprockets 67 and 68 are mounted on the shafts 12 and 47, respectively, and are driven from gears 11 and 46 which mesh with and are driven in opposite directions by a main gear 69 carried by the main drive shaft 70 of the projector. The various drive mechanisms and clutches may be positioned in a suitable housing 71 arranged on one side of the lens 66, as shown in section in Fig. 9. The pulley 26 is connected by a belt 72 to a pulley 73 mounted on a shaft 74 which carries a second pulley 75 connected by a belt 76 to a pulley 77 carried by the spindle 78. Thus, the latter may be driven positively from pulley 26 during rewinding.

As is well known, during rewinding of the film, the upper spindle 78 is driven positively to rewind the film onto the reel carried by the spindle 78. During this rewinding the gear 11 is driven in a direction indicated by the arrow in Fig. 5, relative to the pulley 26. This relative rotation of the clutch parts causes the ball 20 to move in a direction, see Fig. 5, to connect gear 11 to pulley 26 to drive the latter, and hence rotate the spindle 78. This driving relation is the result of the relative rotation of the gear 11 and pulley 26. However, during projection the direction of rotation of gear 11 relative to pulley 26 is reversed, as shown in Fig. 4. The spindle 78 is rotated in a reverse direction by reason of the unwinding of the film, as is well known. This reverse rotation of spindle 78 is transmitted back to pulley 26 to rotate the latter reversely or in the same direction as the rotatation of the gear 11. As the film is being pulled from the upper reel attached to spindle 78 by the sprocket 67 attached to shaft 12, the speed of pulley 26 can never exceed that of gear 11, as is obvious from the step down ratio shown in Fig. 10 and the usual sprocket to reel core diameter ratios. Therefore, the relative direction of rotation of gear 11 to pulley 26 must always be in the clockwise direction shown in Fig. 4 under the above-discussed projection conditions so as to disconnect pulley 26 from gear 11.

Thus, as the clutch parts have a counterclockwise direction of relative rotation, see Fig. 5, during rewinding the parts will be engaged automatically to rotate spindle 78 reversely to rewind the film. However, as the clutch parts are rotated in a clockwise direction of relative rotation during projection, see Fig. 4, they will not be engaged at that time and spindle 78 will idle, the advantages of which are deemed apparent.

The lower pulley 57 on shaft 47 is connected to a belt 80 which drives a pulley 81 carried on shaft 82 which, in turn, is connected in any suitable manner, usually by a belt 83, to the lower or take-up spindle 84. During projection the spindle 84 is rotated in a counterclockwise direction, as viewed in Fig. 10 to wind up the film on the take-up reel after projection. At this time the driver or gear 46 is rotated in the direction shown by the arrow in Fig. 8. The result is that the ball 20 is moved so as to connect the gear 46 to the pulley 57 so as positively to drive the take-up spindle 84 to wind up the film during projection.

As is well known, during the rewinding operation, on the other hand, the main drive gear 69 and the gears 11 and 46 will be rotated in a direction opposite to that used during the projection operation. During the rewinding, the film is drawn from the lower reel and serves to rotate the latter and hence the spindle 84 in a reverse direction. This reverse rotation of the spindle 84 will be transmitted back to pulley 57 to impart a reverse rotation thereto. It is also apparent that near the end of the rewinding operation the speed of rotation of the spindle 84 will be quite high relative to gear 46. This high speed of rotation of the spindle 84 will also cause a high speed reverse rotation of the pulley 57. Now, if an over-running clutch were used on the shaft 47, this high speed reverse rotation of pulley 57 near the end of the rewind operation might cause the lower clutch members to engage, the disadvantages of which are deemed apparent. However, by utilizing a directional clutch on the shaft 47, the clutch members will never be engaged during rewinding. This is due to the fact that the engaging and disengaging of the parts of a directional clutch are determined solely by the direction of rotation of the drive or gear 46. Thus, as the latter rotates in a reverse direction, as indicated by the arrow in Fig. 7, during rewinding, the clutch parts and shaft 46 will never be connected to the spindle 84 during the rewinding operation, the advantages of which are deemed apparent. For these reasons it is highly desirable to employ a directional clutch rather than an over-running clutch on the lower sprocket shaft.

Thus, the present invention provides clutches which serve to connect the engaging elements when the parts are operating in one relation. However, operation in another relation serves to disengage the clutch elements automatically and completely. Furthermore, each type of clutch is admirably suited to the particular functions which it is to perform. While the two types of clutches have certain elements which are common to both clutches, the clutches operate on different principles, and accordingly perform somewhat different functions.

While certain embodiments of the invention have been disclosed, it is to be understood that the inventive idea may be carried out in a number of ways. This application is, therefore, not to be limited to the precise details described, but is intended to cover all variations and modifications therefor which fall within the scope of the appended claims.

What I claim and desire to secure by Letters Patent of the United States is:

1. A clutch comprising, in combination, a drive shaft, a drive member mounted on and secured to said shaft, a driven member loosely mounted on said shaft, means to position said driven member axially on said shaft adjacent said drive member, said drive member being formed with an inclined slot in the side thereof toward said driven member, a ball mounted for free movement in said slot, and a pair of circumferentially-spaced radially-extending shoulders formed on said driven member adjacent said ball, rotation of said drive member in one direction causing said ball to exert forces on a wall of said slot and on one of said shoulders to move said ball out of engagement with said one shoulder to disconnect said members, rotation of said drive member in the opposite direction causing said ball to exert forces on a wall of said slot and the other shoulder to cause said ball to move into driving relation with said other shoulder to connect said members.

2. A clutch comprising, in combination, a drive shaft, a drive member mounted on and secured to said shaft, a driven member loosely mounted on said shaft, means to position said driven member axially on said shaft adjacent said drive member, said drive member being formed with an inclined slot in the side thereof toward said driven member, a ball mounted for free movement in said slot, a pair of circumferentially-spaced radially-extending shoulders formed on said driven member adjacent said ball, and means on at least one of said members to retain said ball in said slot, rotation of said drive member in one direction causing said ball to exert forces on a wall of said slot and on one of said shoulders to move said ball out of engagement with said one shoulder to disconnect said members, rotation of said drive member in the opposite direction causing said ball to exert forces on a wall of said slot and the other shoulder to cause said ball to move into driving relation with said other shoulder to connect said members.

3. A clutch comprising, in combination, a drive shaft, a drive member mounted on and secured to said shaft, a driven member loosely mounted on said shaft, means to position said driven member axially on said shaft adjacent said drive member, said drive member having the side thereof toward said driven member formed with an inclined slot spaced radially from said shaft, a ball mounted in said slot for free movement therein, means to retain said ball against escape from said slot, and a pair of angularly-spaced radially-extending shoulders on said driven member arranged in substantial axial alignment with and positioned on opposite sides of said ball, rotation of said drive member in one direction serving to cause said ball to set up forces on a wall of said slot and one of said shoulders to produce a resulting force sufficient to move said ball out of engagement with said one shoulder to disengage said members, rotation of said drive member in the opposite direction causing said ball to exert forces on a wall of said slot and the other shoulder to produce a resultant force of sufficient intensity and of such a direction to cause the ball to engage said other shoulder to connect said members.

4. A clutch comprising, in combination, a drive shaft, a drive member mounted on and secured to said shaft, a driven member loosely mounted on said shaft, means to position said driven member axially on said shaft adjacent said drive member, an axially projecting flange on said drive member on the side thereof facing said driven member, said flange being formed with an inclined slot spaced radially from said shaft, a ball mounted for free movement in said slot, a ratchet formed on the side of said driven member facing said drive member, means to retain said ball against escape from said slot, and circumferentially-spaced radially-extending shoulders formed on said ratchet and positioned on opposite sides of and in the path of the ball, rotation of said drive member in one direction causing said ball to exert forces on a wall of said slot and on one of said shoulders to move said ball out of engagement with said one shoulder to disconnect said members, rotation of said drive member in the opposite direction causing said ball to exert forces in a wall of said slot and the other shoulder to cause said ball to move into driving relation with said other shoulder to connect said members.

5. An over-running clutch comprising, in combination, a drive shaft, a drive member mounted and secured to said shaft to rotate the latter, a driven member loosely mounted on said shaft, means to position said driven member adjacent but in an axially spaced relation to said driven member, an axially extending flange on the side of said drive member adjacent said driven member, the outer radial face of said flange being formed with an open inclined slot facing said driven member, an axially extending flange on the side of said driven member facing said drive member, a ratchet formed on the periphery of said second flange, said ratchet comprising a pair of circumferentially-spaced radially-extending shoulders in substantial radial and axial alignment with said slot and positioned on opposite sides of said ball, and cooperating means on said first flange and the side of said driven member to prevent escape of said ball from said slot, rotation of said drive member in one direction serving to cause said ball to set up forces on a wall of said slot and one of said shoulders to produce a resulting force sufficient to move said ball out of engagement with said one shoulder to disengage said members, rotation of said drive member in the opposite direction causing said ball to exert forces on a wall of said slot and the other shoulder to produce a resultant force of sufficient intensity and of such a direction to cause the ball to engage said other shoulder to connect said members.

6. An over-running clutch comprising, in combination, a drive shaft, a drive member mounted and secured to said shaft to rotate the latter, a driven member loosely mounted on said shaft, an axially extending flange on the side of said drive member adjacent said driven member, the outer radial face of said flange being formed with an open inclined slot facing said driven member, an axially extending flange on the side of said driven member facing said drive member, a ratchet formed on the periphery of said second flange, said ratchet comprising a pair of circumferentially-spaced radially-extending shoulders in substantial radial and axial alignment with said slot and positioned on opposite sides of said ball, cooperatng means on said first flange and the side of said driven member to prevent escape of said ball from said slot, and means including said flanges for positioning said driven member axially on said shaft relative to said drive member, rotation of said drive member in one direction serving to cause said ball to set up forces on a wall of said slot and one of said shoulders to produce a resulting force sufficient to move said ball out of engagement with said one shoulder to disengage said members, rotation of said drive member in the opposite direction causing said ball to exert forces on a wall of said slot and the other shoulder to produce a resultant force of sufficient intensity and of such a direction to cause the ball to engage said other shoulder to connect said members.

7. A directional clutch comprising, in combination, a drive shaft, a drive member mounted on and secured to said shaft to rotate the latter, a driven member loosely mounted on said shaft, means to position said driven member axially on said shaft relative to said drive member, said drive member being formed with an open inclined slot on the side thereof facing said driven member, a ball loosely positioned in said slot for movement therein, yieldable means to retain said ball in said slot to prevent escape therefrom, and a pair of circumferentially-spaced radially-extending shoulders formed on said driven member adjacent said ball, rotation of said drive member in one direction causing said ball to exert forces on a wall of said slot and on one of said shoulders to move said ball out of engagement with said one shoulder to disconnect said members, rotation of said drive member in the opposite direction causing said ball to exert forces on a wall of said slot and the other shoulder to cause said ball to move into driving relation with said other shoulder to connect said members.

8. A directional clutch comprising, in combination, a stationary element having an aperture extending therethrough, a drive shaft extending through said aperture, a drive member mounted on and secured to said shaft on one side of said element, said drive member having formed thereon an open inclined slot on the side thereof facing said element, a ball loosely positioned for movement along said slot, means for holding said ball in yieldable engagement with said element to retain said ball in said slot to prevent escape therefrom, a driven member loosely mounted on said shaft on the opposite side of said element, an annular flange on said driven member extending through said aperture toward said drive member, a ratchet formed on the periphery of said flange in radial alignment with said ball, and a pair of circumferentially-spaced radially-extending shoulders formed on said ratchet and positioned on opposite sides of said ball, rotation of said drive member in one direction serving to set up forces on said element and on a side of said slot to cause said ball to move into engagement with one of said shoulders to connect said members, rotation of said drive member in the opposite direction serving to set up forces on said element and on a side of said slot to cause said ball to move out of cooperating relation with said ratchet to disconnect said member.

References Cited in the file of this patent

UNITED STATES PATENTS

| | | |
|---|---|---|
| 1,719,881 | Farmer | July 9, 1929 |
| 2,490,172 | Swahnberg | Dec. 6, 1949 |